(12) United States Patent
Zhao et al.

(10) Patent No.: US 12,712,590 B2
(45) Date of Patent: Aug. 18, 2026

(54) PIM CANCELLATION ADAPT ARCHITECTURE

(71) Applicant: XILINX, INC., San Jose, CA (US)

(72) Inventors: Hongzhi Zhao, Los Gatos, CA (US); Ghazaleh Ardeshiri, Sunnyvale, CA (US); Xiaohan Chen, Sunnyvale, CA (US); Hemang M. Parekh, San Jose, CA (US)

(73) Assignee: XILINX, INC., San Jose, CA (US)

( * ) Notice: Subject to any disclaimer, the term of this patent is extended or adjusted under 35 U.S.C. 154(b) by 229 days.

(21) Appl. No.: 18/408,293

(22) Filed: Jan. 9, 2024

(65) Prior Publication Data

US 2025/0226849 A1 Jul. 10, 2025

(51) Int. Cl.
*H04B 1/525* (2015.01)
*H04B 1/00* (2006.01)

(52) U.S. Cl.
CPC ........... *H04B 1/525* (2013.01); *H04B 1/0071* (2013.01)

(58) Field of Classification Search
CPC ....... H04B 1/525; H04B 1/0071; H04B 1/123
See application file for complete search history.

(56) References Cited

U.S. PATENT DOCUMENTS

| | | | | |
|---|---|---|---|---|
| 10,924,141 | B2 * | 2/2021 | Cyzs | H04B 1/123 |
| 11,025,464 | B1 * | 6/2021 | Chen | H04L 25/02 |
| 2017/0077981 | A1 * | 3/2017 | Tobisu | H04B 1/0475 |
| 2018/0123633 | A1 * | 5/2018 | Gravely | H04B 1/10 |
| 2022/0247432 | A1 * | 8/2022 | Li | H04L 5/14 |
| 2023/0094315 | A1 | 3/2023 | Zhao et al. | |
| 2024/0113738 | A1 * | 4/2024 | Zhao | H04B 1/123 |
| 2025/0226849 | A1 * | 7/2025 | Zhao | H04B 1/123 |

OTHER PUBLICATIONS

U.S. Appl. No. 18/128,378, filed Mar. 30, 2023 Entitled "Passive Intermodulation Mitigation Coefficient Determination Based on Received Data".

Kearney, F., et al. "Passive Intermodulation (PIM) Effects in Base Stations: Understanding the Challenges and Solutions," Analog Dialogue, Analog Devices, Mar. 2017.

* cited by examiner

*Primary Examiner* — Md K Talukder
(74) *Attorney, Agent, or Firm* — Patterson + Sheridan, LLP

(57) ABSTRACT

Embodiments herein describe a circuit including a passive intermodulation (PIM) model circuit configured to process first data to generate a PIM interference model output to be concatenated with second data, the second data including a first carrier frequency and a second carrier frequency, and the circuit further including a PIM model adapt circuit configured to receive frequency shifted captured data and frequency shifted PIM models to generate updated values to compensate for PIM interference after the PIM interference model output is concatenated with the second data.

20 Claims, 3 Drawing Sheets

PIM CANCELLATION ADAPT ARCHITECTURE

TECHNICAL FIELD

Examples of the present disclosure generally relate to a passive intermodulation (PIM) cancellation adapt architecture in the uplink multi-carrier intermediate frequency (IF) domain with reduced uplink data interferences.

BACKGROUND

PIM is a growing issue for cellular network operators. PIM issues may occur as existing equipment ages, when co-locating new carriers, or when installing new equipment. PIM is a particular issue when overlaying (duplexing) new carriers into old antenna runs. PIM can create interference that reduces a cell's receive sensitivity or even block calls. This interference can affect both the cell that creates it, as well as other nearby receivers. In cell communication systems, PIM can create interference and reduce receiver sensitivity. For example, in long-term evolution (LTE), if two transmitter carriers transmitting from a base station experience PIM interference, their intermodulation can lead to a component that falls into the receive band. This will affect the receiver as well potentially other systems.

As the spectrum has become more crowded and antenna sharing schemes become more common, there is a corresponding increase in the possibility of PIM interference from the intermodulation of different carriers. The traditional way of using frequency planning to avoid PIM is impractical.

SUMMARY

One embodiment described herein is a circuit including a passive intermodulation (PIM) model circuit configured to process first data to generate a PIM interference model output to be concatenated with second data, the second data including a first carrier frequency and a second carrier frequency, and the circuit further including a PIM model adapt circuit configured to receive frequency shifted captured data and frequency shifted PIM models to generate updated values to compensate for PIM interference after the PIM interference model output is concatenated with the second data.

One embodiment described herein is a method for processing first data, by a passive intermodulation (PIM) model circuit, to generate a PIM interference model output to be concatenated with second data, the second data including a first carrier frequency and a second carrier frequency, and receiving, by a PIM model adapt circuit, frequency shifted captured data and frequency shifted PIM models to generate updated values to compensate for PIM interference after the PIM interference model output is concatenated with the second data.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
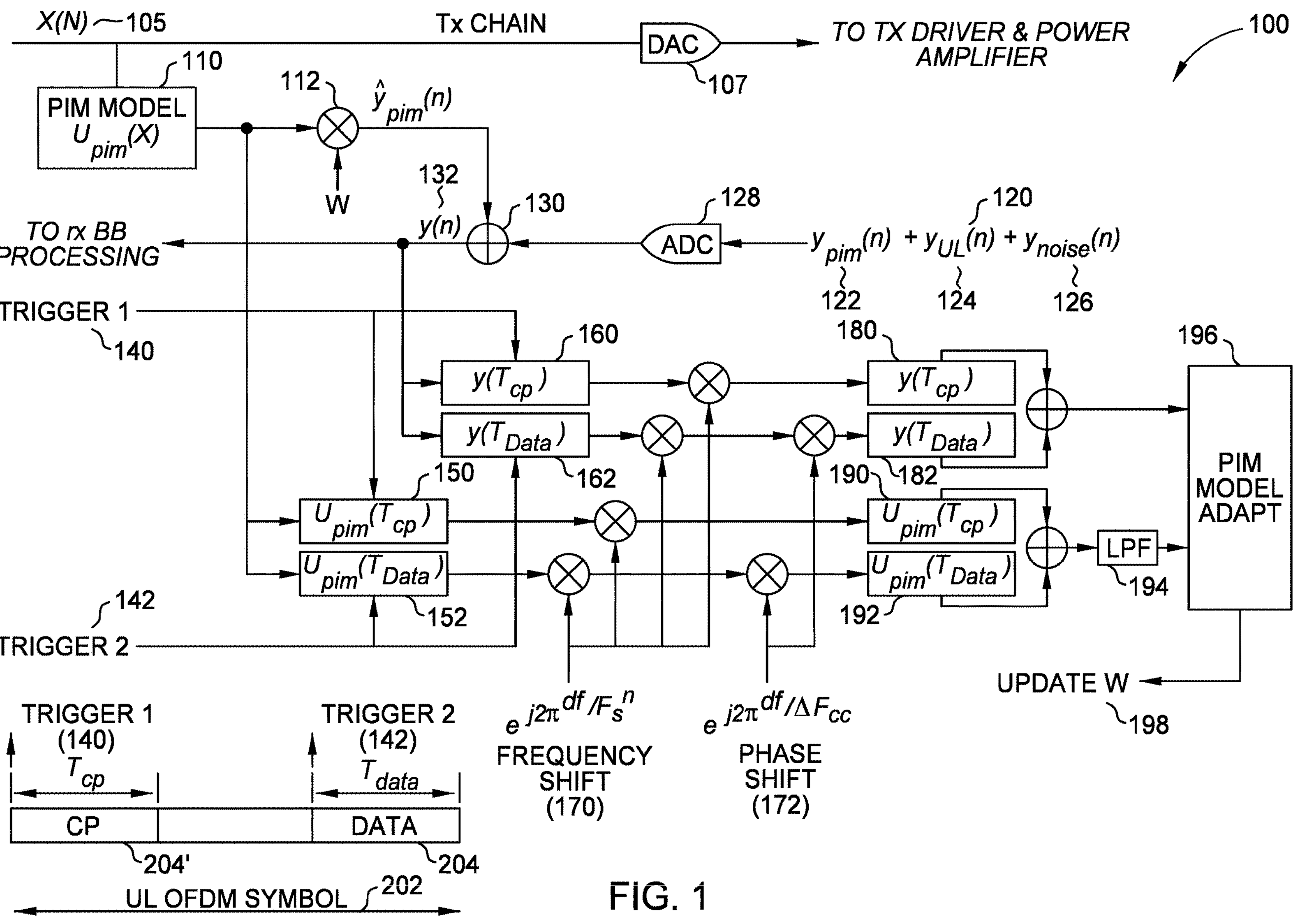
FIG. 1 illustrates a passive intermodulation (PIM) cancellation adapt architecture in the uplink multi-carrier intermediate frequency (IF) domain with reduced uplink data interferences, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a passive intermodulation (PIM) cancellation adapt architecture in the uplink multi-carrier intermediate frequency (IF) domain with reduced uplink data interferences. PIM is a type of Intermodulation Distortion (IMD) that occurs in passive, non-linear components in wireless systems. Passive components are those components, which do not require electrical power to operate. Examples of radiofrequency (RF) passive components include power dividers/combiners, couplers, terminations, coaxial connectors, cables etc. Oxidation, internal resistance, or other effects in passive components can cause the generation of a non-linearity. Non-linearity of components also tends to increase with age.

PIM interference is generated when multiple signals (two or more) are used in passive components with some non-linear elements. Those signals interfere with each other to create unwanted signals. The main sources of PIM are usually junctions between different types of passive components such as a junction between a connector and a cable, two different types of cables made from different materials, a connection between a cable and an antenna, etc. The frequencies of the unwanted signals generated by intermodulation or interference between the signals can be the sum and difference of the frequencies of those individual signals.

PIM is an issue for almost every wireless system, but it is most noticeable in a Frequency Division Duplex (FDD) system like cellular applications (code-division multiple access (CDMA), high-speed packet access (HSPA), and long-term evolution (LTE)). This is because the frequency bands used by these technologies are very close to each other. For example, in LTE Frequency Band 2, the downlink frequency is from 1930 MHz to 1990 MHz, while the uplink frequency range is from 1850 MHz to 1910 MHz. If two transmitter carriers at 1940 MHz and 1980 MHz are transmitting from the base station system with PIM, their intermodulation will lead to a signal at 1900 MHZ, which will fall into the receive band. As such, intermodulation can occur between closely spaced transmitters, where the signal radiated from one transmitter generates intermodulation (IM) products in the output stage of other nearby transmitters. The IM products are then transmitted along with the tuned carrier frequencies of the affected transmitters. IM or IMD is the amplitude modulation of signals containing two or more different frequencies, caused by nonlinearities or time variance in a system.

In a FDD system a duplexer or a triplexer are used to separate transmit and receive signals. A duplexer is an electronic device that allows bi-directional (duplex) communication over a single path. In wireless communications, the transmitted and received signals can occupy different frequency bands. With the duplexer, the high and low frequency signals travel in opposite directions at the shared port of the duplexer. A triplexer is used in triple-band devices for smartphones and wireless devices such as a wireless local area network (LAN), A triplexer is located at the entrance from the antenna, and is a filter element of a 4-port filtering device that separates the three frequency ranges of the triple-band. As such, a triplexer is a 4-port filtering device that splits one input into three different outputs each with a different frequency. The triplexer can also be used the other way round where it routes signals at three different frequencies to a single port. In many systems, the transmitter and receiver will run simultaneously using a duplexer where the transmitter and receiver use different frequencies.

PIM interference can be generated by the transmit signal after the duplexer or triplexer. PIM can fall into the receiving band and is reflected or scattered back along the receiver path to the analog-to-digital converter (ADC). PIM is an interference noise to a receiving data signal. PIM lowers the reliability, capacity, and data rate of wireless systems by limiting the receive sensitivity. The end result may include, e.g., dropped calls, decreased system capacity, and decreased data rates.

Wireless systems need two separate frequency bands or channels. A sufficient amount of guard band separates the two bands so the transmitter and receiver do not interfere with one another. Good filtering or duplexers and possibly shielding are used to ensure the transmitter does not desensitize the adjacent receiver. Frequency-division duplexing (FDD) is a method for establishing a full-duplex communications link that uses two different radio frequencies for transmitter and receiver operation. FDD operation normally assigns the transmitter and receiver to different communication channels. One frequency is used to communicate in one direction, and the other frequency is required to communicate in the opposite direction. The transmit direction and receive direction frequencies are separated by a defined frequency offset.

In radio communications with a transmitter and receiver operating simultaneously within such close proximity, the receiver must filter out as much of the transmitter signal as possible. The greater the spectrum separation, the more effective the filters. FDD uses lots of frequency spectrum, though, generally at least twice the spectrum needed by time division duplexing (TDD). In addition, there must be adequate spectrum separation between the transmit and receive channels. These so-called guard bands are not useable, and, thus, they are wasteful. Given the scarcity and expense of spectrum, these are real disadvantages.

FDD is widely used in cellular telephone systems, such as the widely used global system for mobile communications (GSM). In some systems, the 25-MHz band from 869 to 894 MHz is used as the downlink (DL) spectrum from the cell site tower to the handset, and the 25-MHz band from 824 to 849 MHz is used as the uplink (UL) spectrum from the handset to cell site. Another issue with FDD is the difficulty of using special antenna techniques like multiple-input multiple-output (MIMO) and beamforming. These technologies are a core part of the LTE 4G cell phone strategies for increasing data rates. It is difficult to make antenna bandwidths broad enough to cover both sets of spectrum.

For the wireless FDD MIMO base station, the downlink transmit signal can generate passive intermodulation electromagnetic (E&M) components which fall into the uplink receive bands. The PIM E&M components will reduce the base station receiving sensitivity, hence reducing both uplink receiving data throughput and wireless sector covering range. The PIM interference components are mixed with uplink (UL) receiving signals. The UL receiving signals are treated as noise to the PIM model adapt, which reduces the PIM model accuracy. The exemplary PIM cancellation (PIMC) architecture can remove the uplink data impact on the PIM model adapt with much less data samples used to adapt, and less hardware cost for the implementations. The exemplary PIMC architecture adapts PIM models in the multi-carrier intermediate frequency (IF) domain with reduced uplink data interferences. The IF is a frequency to which a carrier wave is shifted as an intermediate step in transmission or reception. It uses much less data samples and much less hardware cost, thus increasing the adapt speed and reducing the DC power of the implementation. The PIM correction circuit can track the PIM model drift much faster.

FIG. 1 illustrates a passive intermodulation (PIM) cancellation adapt architecture in the uplink multi-carrier IF domain with reduced uplink data interferences, according to an example.

In the PIM cancellation adapt architecture 100, in the transmit (TX) signal, transmit data 105 is received and processed through a digital-to-analog converter (DAC) 107 before being forwarded to a transmitter driver and power amplifier. The transmit data 105 is also provided to the PIM model 110 designated as $U_{pim}(x)$. The output of the PIM model 110 is concatenated with model coefficients W (112) to generate output $\hat{y}_{pim}(n)$. The transmit data 105 can be referred to as first data.

The receive (RX) signal includes three interference components, that is, PIM interference 122, designated as $y_{pim}(n)$, which represents non-linear interference in the RX band, uplink signal 124, designated as $y_{UL}(n)$, and noise interference 126, designated as $y_{noise}(n)$, which may be interference from other sources (e.g., thermal noise) besides the PIM interference 122. The digital output 120 fed to the analog-to-digital converter (ADC) 128 is: $y_{pim}(n)+y_{UL}(n)+y_{noise}(n)$, which is concatenated (130) with output $\hat{y}_{pim}(n)$ to generate receive data 132 designated as y (n). The receive data can be referred to as second data.

The receive data 132 is split into the data captured at the cyclic prefix (CP) part, that is, data 160 designated as y (T_cp), and data captured at the corresponding data part, that is, data 162 designated as y (T_Data).

First trigger information 140 is fed to the data 160 captured at the CP part. The first trigger information 140 includes clock signals aligned with the OFDM symbol 202. The OFDM symbol 202 includes the corresponding data 204, designated as $T_{data}$ and CP data 204'. The first trigger information 140 is aligned with a start point of the CP data 204'. The first trigger information 140 captures the CP data 204'.

First trigger information is also fed into the PIM model 150 for the CP data.

Second trigger information 142 is fed to the data 162 captured at the corresponding data part. The second trigger information 142 includes clock signals aligned with the OFDM symbol 202. The OFDM symbol 202 includes the corresponding data 204, designated as $T_{data}$ and CP data 204'. The second trigger information 142 is aligned with a start point of the corresponding data 204. The second trigger information 142 captures the corresponding data 204.

Second trigger information is also fed into the PIM model 152 for the corresponding data.

The first and second trigger information 140, 142 assist in the decoding of the OFDM symbol as two clocks are aligned with two respective points of the OFDM symbol. In operation, the CP data 204' is first captured in the OFDM symbol 202, which is one of 7 OFDM symbols of a time slot of a frame. After the CP data 204' is captured, there is a wait until the second point in the OFDM symbol 202 is reached to trigger the second trigger information 142. Once that point of the OFDM symbol 202 is reached, the second trigger information 142 is triggered and the corresponding data 204 is captured. The corresponding data 204 is a copy of the CP data 204'.

Subsequently, the data 160 designated as y (T_cp) and the data 162 designated as y (T_Data) are frequency shifted and phase shifted. The frequency shift 170 is given by $$e^{j2\pi df/F_s^n}$$

and the phase shift 172 is given by $$e^{j2\pi df/\Delta f_{cc}}.$$

The frequency shifted CP data 204' is designated as 180 and the frequency shifted corresponding data 204 is designated as 182. As such, the captured data aligned at the two points of the OFDM symbol 202 are shifted. The captured data is shifted, e.g., by less than 10 KHz. It is noted that a frequency shift of less than 10 KHz will not impact the low pass filter design for the PIMC circuit.

Additionally, the PIM models are also frequency shifted. The frequency shifted PIM model pertaining to the CP data 204' is designated as 190 and the frequency shifted PIM model pertaining to the corresponding data 204 is designated as 192. As such, the PIM models aligned at the two points of the OFDM symbol 202 are shifted. The PIM models are also shifted, e.g., by less than 10 KHz. It is noted that a frequency shift of less than 10 KHz will not impact the low pass filter design for the PIMC circuit. As such, both the captured data and the PIM models are frequency shifted by less than 10 KHz.

The sum of the frequency shifted PIM models 190, 192 are fed to a low pass filter 194. The PIM models 190, 192 usually need to be filtered by a low pass filter to reflect the cavity filters in the uplink received RF chain including band pass cavity filter and duplexers/triplexers. The sum of the frequency shifted captured data 180, 182 and the frequency shifted PIM models 190, 192 passed through the low pass filter 194 are fed into a PIM model adapt circuit 196 to provide updated model coefficients 198.

The memory buffer pairs, that is, PIM models 150, 152, the data 160 designated as y (T_cp) and the data 162 designated as y (T_Data), the frequency shifted CP data designated as 180 and the frequency shifted corresponding data designated as 182, and the frequency shifted PIM models 190, 192 are collectively referred to as a double buffer or double buffer structure. As such, the double buffer consists of memory buffer pairs 150/152, 160/162, 180/182, 190/192. These memory buffer pairs, with the related multipliers, adders, frequency shifters, and low pass filter 194, store and process corresponding data samples of the CP and the data at the end part of the OFDM symbol, including both received data and PIM model data. The double buffer structure can remove UL data from the received data by using the ADC 128.

The shift of the PIM models 150, 152 by +/−10 KHz will not impact the accuracy of the PIM models because there is usually at least a 200 KHz guard band for an uplink signal. For example, a LTE5 has about a 4.5 MHz signal bandwidth, and a 250 KHz guard bandwidth on each side thereof. The UL band is usually in the order of several MHz. In one example, for an LTE Band 3, the UL is specified from 1850 MHz to 1910 MHz, and the UL band is 75 MHz. The UL band low pass filter (e.g., low pass filter 194) used for the PIM model adapt circuit 196 has a similar UL band of 75 MHz. A frequency shift of the spectrum contents including the PIM interference and the uplink carrier frequency data of less than 10 KHz does not change the frequency location of each signal component. In other words, the useful components within the UL band of 75 MHz will not be shifted out of the UL band (with a 10 KHz shift). Further, new PIM interference will also not be shifted into the UL band (with a 10 KHz shift). As such, there is no need to change the low pass filter design.

The PIM cancellation performance using the PIM cancellation adapt architecture 100 by adding the samples captured at uplink CP part and samples captured at corresponding uplink data part shows much better performance than a conventional architecture that simply concatenates the captured samples. The advantages of the PIM cancellation adapt architecture 100 include avoiding PIM model adapt divergence due to strong receiving uplink signals and less samples for the adapt. The less adapt samples, the faster the adapt speed. In one example, the adapt samples are about 1000 data samples. The uplink data power is about 20 dB higher than the PIM data power. The PIM is even worse after adapt (PIM divergence) using the concatenate architecture. In contrast, the proposed PIM cancellation adapt architecture 100 can correct the PIM to noise floor level.

Figure 2:
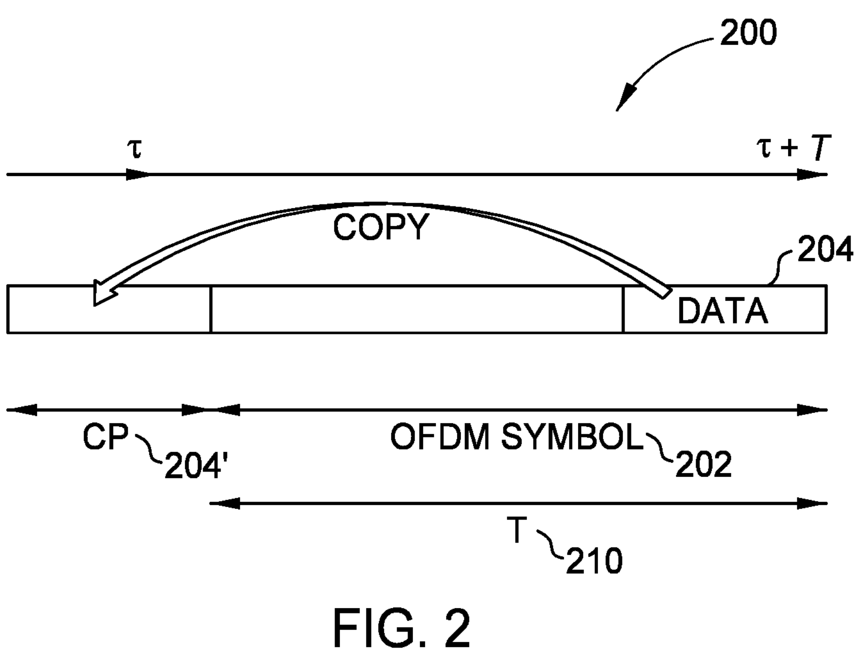
FIG. 2 is an orthogonal frequency-division multiplexing (OFDM) symbol structure for 4G long-term evolution (LTE) and 5G NR (new radio), according to an example.

FIG. 2 is an orthogonal frequency-division multiplexing (OFDM) symbol structure for 4G long-term evolution (LTE) and 5G NR (new radio), according to an example.

In the OFDM symbol structure 200, the corresponding data 204 is copied to the prefix, as cyclic prefix (CP) 204'. The period 210 (T) of an OFDM symbol 202 is either 1/15 KHz or 1/30 KHz for 4G LTE and 5G NR.

The uplink transmit data for 4G LTE uplink data can be given as:

$$x_{UL}(\tau) = -x_{UL}(\tau + T) \text{ for } \tau \text{ inside } CP. \quad (1)$$

The uplink transmit data for 5G NR uplink data can be given as:

$$x_{UL}(\tau)=x_{UL}(\tau+T) \text{ for } \tau \text{ inside } CP. \tag{2}$$

A 4G LTE uplink frame structure includes a plurality of frames or LTE frames. Each frame has a frame duration of 10 ms. One frame has 10 subframes. As such, each subframe has a duration of 1 ms. Each subframe has two time slots. As such, each time slot has a duration 0.5 ms. Each frame has 20 time slots. Each slot has 7 orthogonal frequency division multiplexing (OFDM) symbols. The 7 OFDM symbols are separated from each other a cyclic prefix (CP). This is referred to as the normal CP length. The normal CP length is designed to support propagation conditions with a delay spread up to 4.7 μs. Also, since each subframe has two time slots, each subframe has 14 OFDMs or 14 data packets, A 4G LTE downlink frame structure is similar to the 4G LTE uplink frame structure. In the LTE FOD frame structure, both the downlink and uplink transmission happen at the same time with different frequencies.

Regarding CP, CP refers to the prefixing of a symbol with repetition of the end. In other words, an initial part of the symbol is copied or duplicated and inserted at the end of the symbol. Stated differently, the CP copies a part of the initial information (prefix) to the end of each symbol (cyclic). The CP serves to provide a guard interval to eliminate inter-symbol interference from the previous symbol. As such, the CP is a set of samples that are duplicated (copied and pasted) to the end of each transmitted symbol to its beginning, functioning as a guard interval, allowing to eliminate inter-symbol interference (ISI), practically without additional hardware needs.

Regarding the 5G new radio (NR) frame structure, 5G NR supports two frequency ranges FR1 (Sub 6 GHz) and FR2 (millimeter wave range, 24.25 to 52.6 GHz). NR uses flexible subcarrier spacing derived from basic 15 KHz subcarrier spacing used in LTE. Similarly to 4G LTE uplink and downlink frame structures, a 5G NR frame structure has a plurality of frames. Each frame includes 10 subframes. A frame has a duration of 10 ms and each subframe has a duration of 1 ms, similar to 4G LTE.

Each subframe can have $2^{\mu}$ slots (as opposed to LTE where the subframe has exactly 2 slots), where p can be any value from 0 to 5. Each slot usually consists of 14 OFDM symbols. The slot length scales with subcarrier spacing. The radio frames of 10 ms are transmitted continuously. The subframe is of fixed duration (i.e., 1 ms), whereas slot length varies based on subcarrier spacing and the number of slots per subframe, that is, 1 ms for 15 KHz, 500 μs for 30 KHz and so on. Subcarrier spacing of 15 KHz occupy 1 slot per subframe, subcarrier spacing of 30 KHz occupy 2 slots per subframe and so on. Each slot occupies either 14 OFDM symbols based on normal CP. As such, for μ=0 there is 1 slot per subframe, for μ=1 there are 2 slots per subframe, for μ=2 there are 4 slots per subframe and so on. The number of slots per frame is ten times the number of slots per subframe. Hence, for μ=2, there are 40 slots/frame, 5G NR uses 4096 FFT points which consists of 3300 data subcarriers for a maximum bandwidth of 400 MHz.

To summarize, when the subcarrier spacing is 15 kHz, the OFDM symbol duration is 1/15 KHz=66.7 μs, the CP duration is 4.7 μs, the maximum FFT size is 4096, the symbols per slot are 14, and the slots per frame are 10. When the subcarrier spacing is 30 kHz, the OFDM symbol duration is 1/30 KHz=33.3 μs, the CP duration is 2.3 μs, the maximum FFT size is 4096, the symbols per slot are 14, and the slots per frame are 20.

For LTE, the LTE signal is an OFDM modulation using a carrier spacing of 15 kHz. LTE is intended to work with a 30.72 Msps sampling clock for a 20 MHz bandwidth signal, so the timing parameters are defined in terms of samples at this clock rate. The useful time of a symbol is ~66.666 μs (the reciprocal of 15 kHz), or 2048 samples. In normal CP, the first symbol has 160 samples and the rest of the symbols (6 remaining) each have 144 samples. The useful time of a symbol is 2048 samples. As such, the total number of samples in a time slot or 0.5 ms is 15,360. This can be computed as 160×1, 144× 6, and 2048×7. However, in the instant case, when processing occurs in the IF domain, with a sample rate of 491.52 MHz, the CP will include more than 2000 samples. In other words, each CP of each OFDM symbol will be more than 2000 samples. This will result in the useful time of each symbol to be less than 2048 samples. As such, the duration time remains constant and the number of samples depend on the sample rate.

Figure 3:
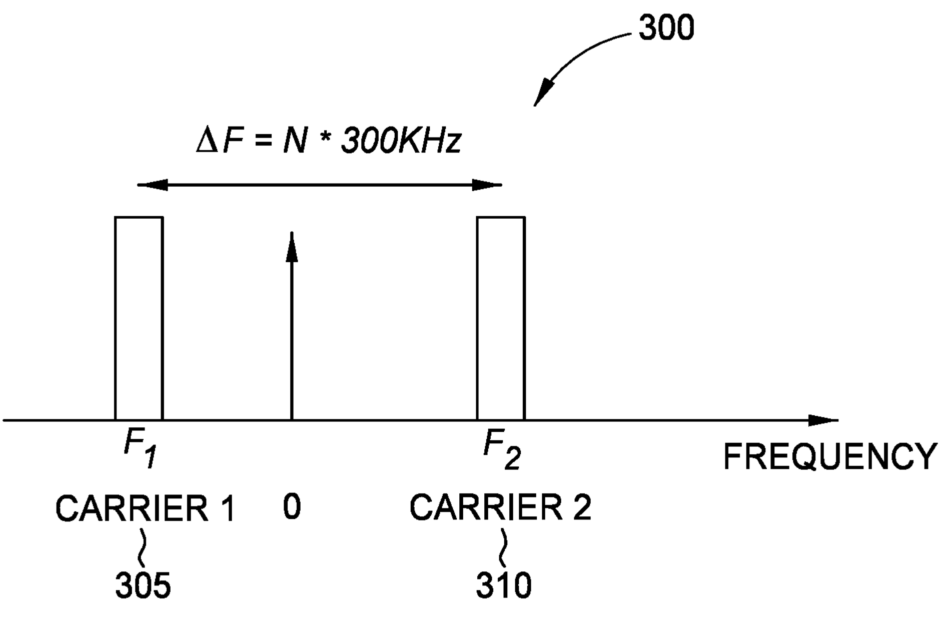
FIG. 3 illustrates a frequency gap configuration of a multi-carrier of a receiving signal, according to an example.

FIG. 3 illustrates a frequency gap configuration of a multi-carrier of a receiving signal, according to an example.

The frequency gap configuration 300 depicts a first carrier frequency 305 and a second carrier frequency 310. The frequency gap between the first carrier frequency 305 and the second carrier frequency 310 is ΔF=N*300 KHz. The 3GPP Standard specifies that the frequency gap between multi-carriers is N×100 KHz, where N is an integer. The base frequency of carrier components of 4G LTE/5G NR is 15 KHz or 30 KHz. The least common multiple of 100 KHz and 15 KHz/30 KHz is 300 KHz.

The first carrier frequency 305 is an uplink (UL) carrier frequency and the second carrier frequency 310 is also an UL carrier frequency. The first and second UL carrier frequencies 305, 310 are located within a UL band including PIM interference components or circuits. The UL band is usually the same shape as the UL band of an RF pass band filter in the UL received RF chain. The first and second UL carrier frequencies 305, 310 are separated by multiple integers of 300 KHz to take advantage of the fact that the CP is a copy of the end part of the OFDM data and can be used to reduce or remove the UL receiving signal's impact on the PIM model 110. Without the separation of the first and second UL carrier frequencies 305, 310 by multiple integers of 300 KHz, digital signal processing circuitry would be used to shift each carrier frequency to baseband, as well as to filter out other unwanted carrier frequencies. This is referred to as a separate adapt as the carrier frequencies are separated adapted or separately processed or processed individually. In other words, the first carrier frequency 305 would be processed (I.e., frequency shifted and passed through a low pass filter) and then forwarded to the PIM model adapt circuit 196. Once this process is completed, the second carrier frequency 310 would be processed (i.e., frequency shifted and passed through a low pass filter) and then forwarded to the PIM model adapt circuit 196. In contrast, the PIM cancellation adapt architecture 100 employs the frequency gap configuration 300 to enable a joint adapt of the first and second UL carrier frequencies 305, 310. Joint adapt refers to concurrently or simultaneously processing the first and second UL carrier frequencies 305, 310 in the IF domain. Thus, the first and second UL carrier frequencies 305, 310 are jointly processed and jointly forwarded to the PIM model adapt circuit 196.

To assist the PIM model adapt with a PIM signal mixed with the UL receiving signal, the frequency gap between the first and second UL carrier frequencies 305, 310 is set to N×300 KHz, where N is an integer. This also meets the 3GPP intra band contiguous carrier aggregation requirement in a frequency division duplex (FDD) system. If ΔF does not meet N×300 KHz, a carrier frequency adjustment of δf=+/−50 KHz can be made accordingly.

Carrier aggregation was first introduced in LTE by the third-generation partnership project (3GPP) Release 10 to combine different chunks of spectrum for higher peak rates. When a network aggregates two or more chunks of spectrum, one will play a more important role than the other(s). Each chunk is referred to as a component carrier (CC), with the most important one being the primary component carrier (PCC). The others are referred to as secondary component carriers.

Carrier aggregation is used in LTE-Advanced in order to increase the bandwidth, and thereby increase the bitrate. Since it is important to keep backward compatibility with R8 and R9 user equipment (UE), the aggregation is based on R8/R9 carriers. Carrier aggregation can be used for both FDD and TDD.

Each aggregated carrier is referred to as a component carrier, CC. The component carrier can have a bandwidth of 1.4, 3, 5, 10, 15 or 20 MHz and a maximum of five component carriers can be aggregated, hence the maximum aggregated bandwidth is 100 MHz. In FDD the number of aggregated carriers can be different in the downlink (DL) and the uplink (UL). However, the number of UL component carriers is always equal to or lower than the number of DL component carriers. The individual component carriers can also be of different bandwidths.

The easiest way to arrange aggregation is to use contiguous component carriers within the same operating frequency band (as defined for LTE), so called intra-band contiguous. This might not always be possible, due to operator frequency allocation scenarios. For non-contiguous allocation it could either be intra-band, i.e., the component carriers belong to the same operating frequency band, but have a gap, or gaps, in between, or it could be inter-band, in which case the component carriers belong to different operating frequency bands. The spacing between the center frequencies of two contiguous CCs is N×300 kHz, N=integer.

The term component carrier used in this context refers to any of the bandwidths defined in Release 8/9 LTE. To meet International Telecommunication Union (ITU) 4G requirements, LTE-Advanced supports three component carrier aggregation scenarios, that is, intra-band contiguous, intra-band non-contiguous, and inter-band non-contiguous aggregation. The spacing between center frequencies of contiguously aggregated component carriers will be a multiple of 300 KHz to be compatible with the 100 kHz frequency raster of Release 8/9 and at the same time preserve orthogonality of the subcarriers, which have 15 kHz spacing. Depending on the aggregation scenario, the n×300 kHz spacing can be facilitated by inserting a low number of unused subcarriers between contiguous component carriers.

With reference to PIM, as noted above, the 3GPP Standard specifies that the frequency gap between multi-carriers is N×100 KHz, where N is integer. The base frequency of carrier components of 4G LTE/5G NR is 15 KHz or 30 KHz. The least common multiple of 100 KHz and 15 KHz/30 KHz is 300 KHz. To assist a PIM model adapt with PIM signals mixed with the receiving signal, the frequency gap between the two carriers is set to N×300 KHz, where N is integer. This also meets the 3GPP intra-band contiguous carrier aggregation requirement in FDD system.

The time aligned data captured during the CP and the corresponding data part are given as:

Data captured at the CP part:

$$s_1(\tau) = e^{j\phi_1} e^{j2\pi f_1 \tau} x_{UL}^1(\tau) \tag{3}$$

$$s_2(\tau) = e^{j\phi_2} e^{j2\pi f_2 \tau} x_{UL}^2(\tau)$$

$$\text{where } \phi_1 = 2\pi f_1 t_0 \text{ and } \phi_2 = 2\pi f_2 t_0 \tag{4}$$

$t_0$ is the time instant at the beginning of the OFDM symbol to capture the data samples for PIM model adapt.

Data captured at the corresponding data part:

$$s_1(\tau+T) = e^{j\phi_1} e^{j2\pi f_1(\tau+T)} x_{UL}^1(\tau+T) \tag{5}$$

$$s_2(\tau+T) = e^{j\phi_2} e^{j2\pi f_2(\tau+T)} x_{UL}^2(\tau+T)$$

The captured data is frequency shifted by df as follows:

$$f_1 + df = M*30\text{ KHz, where } M \text{ is integer.}$$

$$f_2 + df = f_1 + N*300\text{ KHz} + df = (M + N*10)*30\text{ KHz}$$

It is noted that: |df|≤10 KHz, which will not impact the low pass filter design for the PIMC circuits.

The frequency shifted capture data for the CP part is given as:

$$s_1(\tau) = e^{j\phi_1} e^{j2\pi(f_1+df)\tau} x_{UL}^1(\tau) \tag{6}$$

$$s_2(\tau) = e^{j\phi_2} e^{j2\pi(f_2+df)\tau} x_{UL}^2(\tau)$$

The frequency shifted capture data for the corresponding data part is given as:

$$s_1(\tau+T) = e^{j\phi_1} e^{j2\pi(f_1+df)(\tau+T)} x_{UL}^1(\tau+T) \tag{7}$$

$$s_2(\tau+T) = e^{j\phi_2} e^{j2\pi(f_2+df)(\tau+T)} x_{UL}^2(\tau+T)$$

It is noted that:

$$2\pi(f_1+df)*T = 2\pi M*30\text{ KHz}*\left(\frac{1}{15\text{ KHz}} \text{ or } \frac{1}{30\text{ KHz}}\right) \to \text{multiples of } 2\pi$$

$$2\pi(f_2+df)*T = 2\pi(10*N+M)*30\text{ KHz}*\left(\frac{1}{15\text{ KHz}} \text{ or } \frac{1}{30\text{ KHz}}\right) \to \text{multiples of } 2\pi$$

The captured data part samples are given as:

$$s_1(\tau+T) = e^{j\phi_1} e^{j2\pi(f_1+df)\tau} x_{UL}^1(\tau+T) \tag{8}$$

$$s_2(\tau+T) = e^{j\phi_2} e^{j2\pi(f_2+df)\tau} x_{UL}^2(\tau+T)$$

The captured CP samples are given as:

$$S_{CP} = e^{j\phi_1} e^{j2\pi(f_1+df)\tau} x_{UL}^1(\tau) + e^{j\phi_2} e^{j2\pi(f_2+df)\tau} x_{UL}^2(\tau) \quad (9)$$

The captured data samples are given as:

$$S_{Data} = e^{j\phi_1} e^{j2\pi(f_1+df)\tau} x_{UL}^1(\tau+T) + e^{j\phi_2} e^{j2\pi(f_2+df)\tau} x_{UL}^2(\tau+T) \rightarrow \quad (10)$$

$$S_{CP} +/- S_{Data} = e^{j\phi_1} e^{j2\pi(f_1+df)\tau}\{x_{UL}^1(\tau) +/- x_{UL}^1(\tau+T)\} + e^{j\phi_2} e^{j2\pi(f_2+df)\tau}\{x_{UL}^2(\tau) +/- x_{UL}^2(\tau+T)\} = 0,$$

$$\text{Note: } (+)\text{: } LTE,\ (-)\text{: } NR \quad (11)$$

Regarding the PIM mode adapt, the PIM model is adapted using captured samples at both the CP part and the corresponding data part of the uplink OFDM symbols. The equations are given as:

$$U_{pim}(n \in CP) * W = y_{pim}(n \in CP) + S_{UL}(n \in CP) + y_{noise}(n \in CP) \quad (12)$$

$$U_{pim}(n \in \text{Data}) * W = y_{pim}(n \in \text{Data}) + S_{UL}(n \in \text{Data}) + y_{noise}(n \in \text{Data}) \quad (13)$$

where W are the model coefficients.

The frequency shift is given as:

$$e^{j2\pi df/F_s^n} U_{pim}(n \in CP) * W = e^{j2\pi df/F_s^n}\{y_{pim}(n \in CP) + S_{UL}(n \in CP) + y_{noise}(n \in CP)\} \quad (14)$$

$$e^{j2\pi df/F_s^n} e^{j2\pi df/F_s^n} U_{pim}(n \in \text{Data}) * W = e^{j2\pi df/F_s^n} e^{j2\pi df/F_s^n}\{y_{pim}(n \in \text{Data}) + s_{UL}(n \in \text{Data}) + y_{noise}(n \in \text{Data})\} \quad (15)$$

Adding the two frequency shift equations provides: $y_{noise}(n \in CP) + y_{noise}(n \in \text{Data})$, which is still noise due to their being not correlated. This provides:

$$\{e^{j2\pi df/F_s^n} U_{pim}(n \in CP) \pm e^{j2\pi df/F_s^n} e^{j2\pi df/F_s^n} U_{pim}(n \in \text{Data})\} * W = e^{j2\pi df/F_s^n} y_{pim}(n \in CP) \pm e^{j2\pi df/F_s^n} e^{j2\pi df/F_s^n} y_{pim}(n \in \text{Data}) + y_{noise} \quad (16)$$

It is noted that $T+\tau \rightarrow N+n$. $N=F_s*T=F_s=F_s/\Delta f_{cc}$ is the number of samples of the OFDM symbol without CP at the sampling rate $F_s$.

It is further noted that $\Delta f_{cc}$ is a base frequency of the OFDM component carriers (i.e., 15 KHz or 30 KHz).

Figure 4:
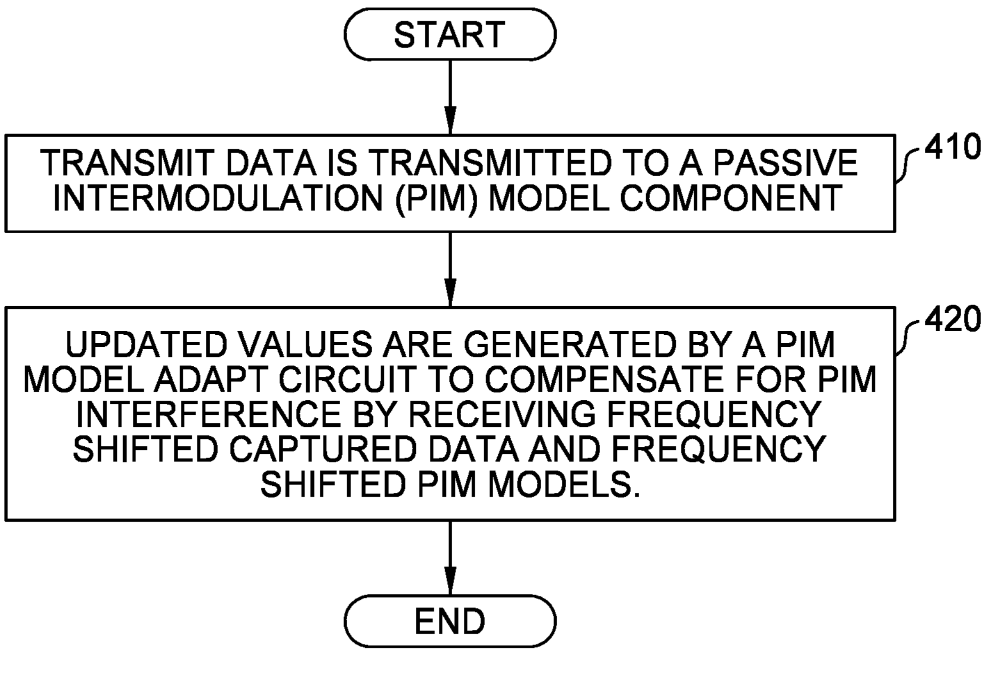
FIG. 4 illustrates a method for implementing the PIM adapt architecture in the uplink multi-carrier IF domain.

FIG. 4 illustrates a method for implementing the PIM adapt architecture in the uplink multi-carrier IF domain.

At block 410, transmit data is transmitted to a passive intermodulation (PIM) model component. The transmit data is received and processed through a digital-to-analog converter (DAC) before being forwarded to a transmitter driver and power amplifier. The transmit data is also provided to the PIM model.

At block 420, updated values are generated by a PIM model adapt circuit to compensate for PIM interference by receiving frequency shifted captured data and frequency shifted PIM models. The frequency shift is given by $$e^{j2\pi df/F_s^n}$$

and the phase shift is given by $$e^{j2\pi df/\Delta f_{cc}}.$$

As such, the captured data aligned at the two points of the OFDM symbol are shifted. The captured data is shifted, e.g., by less than 10 KHz. It is noted that a frequency shift of less than 10 KHz will not impact the low pass filter design for the PIMC circuit.

In conclusion, the PIMC architecture is used in the IF domain to remove uplink data from the receiver by using a double buffer structure. However, when using the PIMC architecture in the IF domain, the CP samples increase. To compensate for the increased CP samples, a frequency shift of the captured (receiver) data is performed and a frequency shift of the PIM models is performed without changing the uplink band low pass filter. In one example, the frequency is shifted by +/−10 KHz.

The PIMC architecture adapts PIM models in the multi-carrier IF domain with reduced uplink data interferences. The PIMC architecture uses less data samples and reduces hardware cost, and hence increases the adapt speed and reduces the DC power of the implementation.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A circuit comprising:

a passive intermodulation (PIM) model circuit configured to process first data including a cyclic prefix portion and a data portion of an orthogonal frequency division multiplexing (OFDM) symbol to generate a PIM interference model output to be concatenated with second data, the second data including a first carrier frequency and a second carrier frequency; and a PIM model adapt circuit configured to receive frequency shifted captured data and frequency shifted PIM models during at least one of the cyclic prefix portion and the data portion based on corresponding trigger signals to generate updated values to compensate for PIM interference after the PIM interference model output is concatenated with the second data.

2. The circuit of claim 1, wherein the PIM model adapt circuit operates in an intermediate frequency (IF) domain and jointly adapts the first carrier frequency and the second carrier frequency within the IF domain.

3. The circuit of claim 1, wherein the second data includes PIM interference data, an uplink receiving signal, and noise interference data.

4. The circuit of claim 1, wherein the second data is split into cyclic prefix (CP) data and corresponding data.

5. The circuit of claim 4, wherein the CP data and the corresponding data are part of OFDM symbols.

6. The circuit of claim 5, wherein the CP data is frequency shifted separately than the corresponding data within a double buffer structure.

7. The circuit of claim 6, wherein only the corresponding data is phase shifted within the double buffer structure.

8. The circuit of claim 7, wherein the CP data is frequency shifted by +/−10 KHz and the corresponding data is phase shifted by +/−10 KHz.

9. The circuit of claim 4, wherein the PIM model circuit includes a first PIM model related to the CP data and a second PIM model related to the corresponding data.

10. The circuit of claim 9, wherein the first PIM model related to the CP data is frequency shifted separately than the second PIM model related to the corresponding data.

11. The circuit of claim 10, wherein only the second PIM model related to the corresponding data is phase shifted.

12. The circuit of claim 4, wherein first trigger information is aligned with a starting point of the CP data and second trigger information is aligned with a starting point of the corresponding data.

13. A method comprising:

processing first data, by a passive intermodulation (PIM) model circuit, the first data including a cyclic prefix portion and a data portion of an orthogonal frequency division multiplexing (OFDM) symbol, to generate a PIM interference model output to be concatenated with second data, the second data including a first carrier frequency and a second carrier frequency; and receiving, by a PIM model adapt circuit, frequency shifted captured data and frequency shifted PIM models during at least one of the cyclic prefix portion and the data portion based on corresponding trigger signals to generate updated values to compensate for PIM interference after the PIM interference model output is concatenated with the second data.

14. The method of claim 13, wherein the PIM model adapt circuit operates in an intermediate frequency (IF) domain and jointly adapts the first carrier frequency and the second carrier frequency within the IF domain.

15. The method of claim 13, wherein the second data includes PIM interference data, an uplink receiving signal, and noise interference data.

16. The method of claim 13, wherein the second data is split into cyclic prefix (CP) data and corresponding data.

17. The method of claim 16, wherein the CP data and the corresponding data are part of OFDM symbols.

18. The method of claim 17, wherein the CP data is frequency shifted separately than the corresponding data within a double buffer structure.

19. The method of claim 18, wherein only the corresponding data is phase shifted within the double buffer structure.

20. The method of claim 19, wherein the CP data is frequency shifted by +/−10 KHz and the corresponding data is phase shifted by +/−10 KHz.

* * * * *